Nov. 7, 1950        G. A. LYON        2,528,528
METHOD OF AND APPARATUS FOR FORMING PLASTIC
Filed June 15, 1945        2 Sheets-Sheet 1
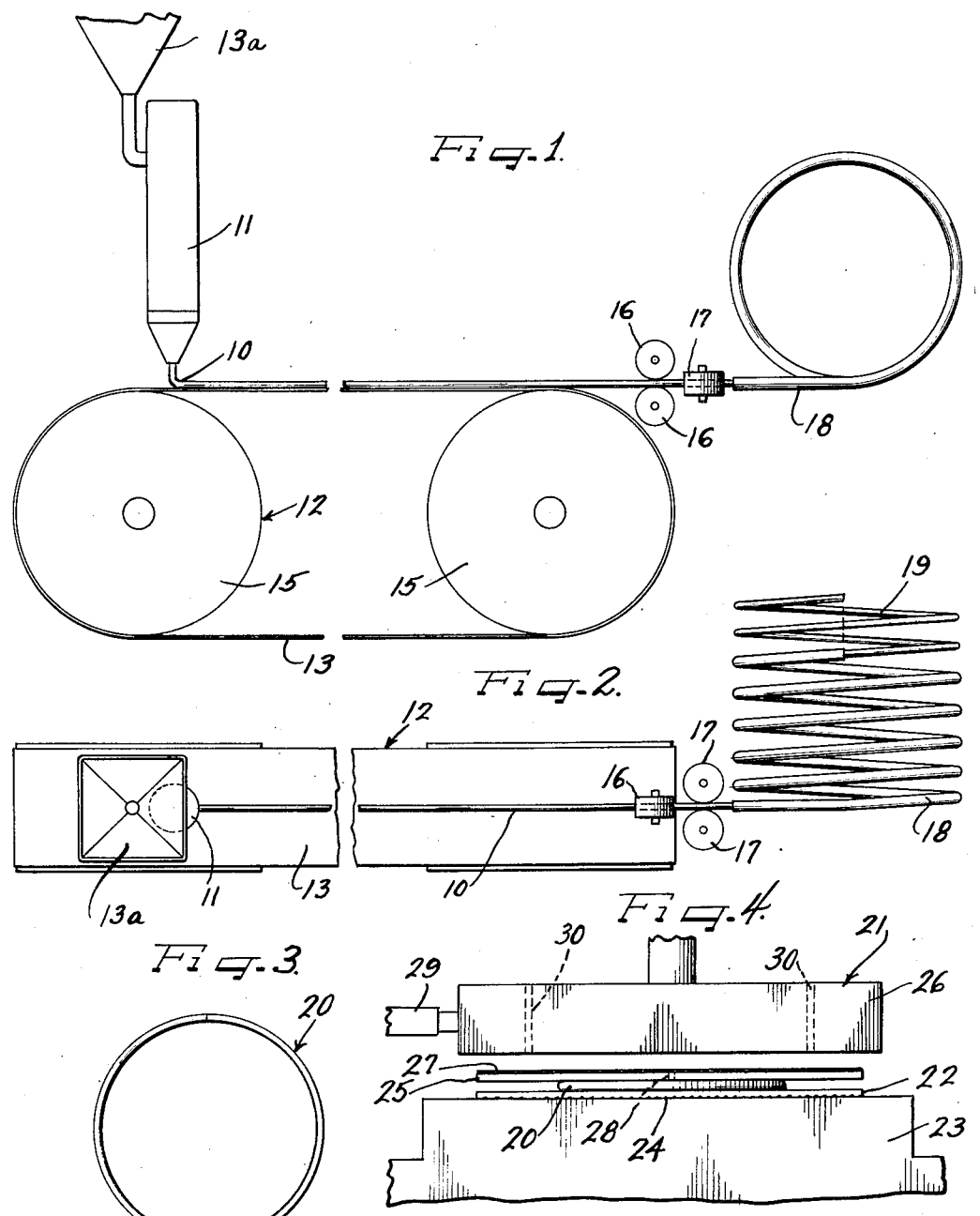
Inventor
GEORGE ALBERT LYON Nov. 7, 1950 G. A. LYON 2,528,528
METHOD OF AND APPARATUS FOR FORMING PLASTIC
Filed June 15, 1945 2 Sheets-Sheet 2
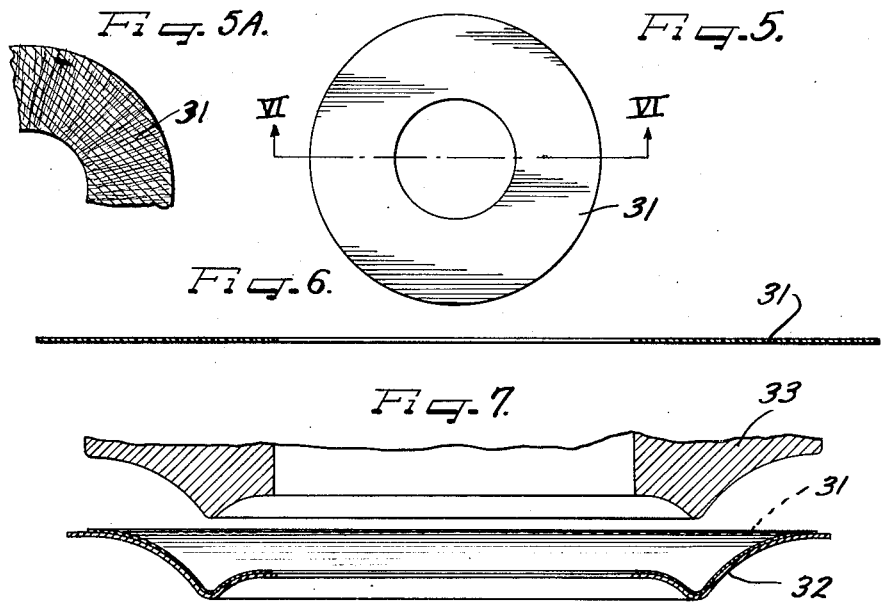
Inventor
GEORGE ALBERT LYON Patented Nov. 7, 1950

2,528,528

UNITED STATES PATENT OFFICE 2,528,528

METHOD OF AND APPARATUS FOR FORMING PLASTIC

George Albert Lyon, Allenhurst, N. J.

Application June 15, 1945, Serial No. 599,532

11 Claims. (Cl. 18—4)

This invention relates to the manufacture of plastic materials and articles, and more particularly to a method of and apparatus for manufacturing plastic sheeting and flat and circular plastic articles.

This application is a continuation in part of my application Serial No. 543,525 filed July 5, 1944, now Patent No. 2,447,416 dated August 17, 1948.

In the past plastic sheeting has been manufactured by a number of different processes, of which the most commonly known are the calendering and casting processes.

In the calendering method of making plastic sheeting, such as by pressing the plastic between polished rolls, it has not been feasible to obtain a thin sheeting with highly polished surfaces free of air voids or pockets. This has been, in part, due to the tacky nature of the material and its tendency to adhere to the rolls as it is being stripped therefrom.

It is true that very thin plastic sheet can be cast by flowing heated liquid or liquid plastic in solution over a smooth plate and that such sheet does possess a highly polished finish. However, such a process of casting plastic is so expensive as to make its use prohibitive where plastic articles have to be manufactured from sheeting at prices at least comparable to those existent in the fabrication of similar articles from metal sheeting.

One of the reasons why this process is so costly is because of the time factor required in the setting of the plastic after it has been cast.

If the sheet that is desired is more than a film, it will, of course, be appreciated that the casting process is even more expensive and is by far more costly than the making of a sheet by the calendering process.

I propose to provide a method or process of and apparatus for manufacturing plastic sheeting or articles made therefrom which provides plastic having a more highly polished surface than plastic made by the calendering method, and which, in addition, is by far more economical to make than is true in the casting method.

Another object of my invention is to provide a method of and apparatus for manufacturing plastic sheet and articles made therefrom which lends itself to large scale production and which will enable fabrication of articles on a cost basis approximating the cost of making similar articles out of metal sheeting.

A further object of the invention relates to the provision of a novel method of and apparatus for manufacturing from extruded plastic a continuous procession of plastic rings or doughnuts which particularly lend themselves to use as automobile wheel covers and the like.

In one form of the invention, the heated strip stock is first formed into helical form and convolutions are cut therefrom which are subsequently pressed between polished surfaces into a flattened condition.

Another feature of the invention relates to so squeezing the rod-like plastic stock that in the ensuing flattened stock the grain extends generally radially, in spoke-like manner, whereby the plastic stock has relatively great tensile strength in radial directions.

Other objects and features of this invention will more fully appear from the following detailed description, taken in connection with the accompanying drawings, which illustrate several embodiments thereof, and in which Figure 1 is a fragmentary diagrammatic side view of one form of apparatus for producing one form of my novel process;

Figure 2 is a fragmentary plan view of the apparatus shown in Figure 1;

Figure 3 is a plan view of a plastic strip ring made from one of the convolutions of the plastic helix made by the use of the apparatus shown in Figures 1 and 2;

Figure 4 is a fragmentary diagrammatic view illustrating how the ring of Figure 3 may be pressed into a flat or doughnut form;

Figure 5 is a plan view of a plastic doughnut made by the apparatus shown in Figure 4;

Figure 5A is a fragmentary diagrammatic sectional view through a portion of the circular sheet of Figure 5 showing how the grain of the plastic extends in spoke-like manner radially from the center of the sheet or ring;

Figure 6 is a sectional view taken on the line VI—VI of Figure 5 looking in the direction indicated by the arrows; and Figure 7 is a fragmentary diagrammatic view showing apparatus for pressing the doughnut of Figures 5 and 6 into a dished form.

As shown on the drawing:

It is believed that my novel process embodying the features of this invention may be best understood from a description of the apparatus for producing the same.

The form of the invention illustrated in Figures 1 to 7, inclusive, contemplates the flattening of extruded plastic strip stock, but in addition, also contemplates the fabrication of the flattened plastic in a dished article of manufacture. It, of course, will be clear, however, from the description to follow that extruded strip or rod plastic stock is in the course of the process or method of my invention at sometime or other flattened from a strip or rod form into a flat or sheet form.

As best shown in Figure 1, plastic strip or rod stock 10 is extruded from a conventional extruding machine 11 onto an endless belt conveyor designated generally by the reference character 12. The stock in the extruder 11 is, of course, heated so as to be in a flat flowable state as is well known in the extruding art. The temperature to which the plastic material, that is introduced in the extruding machine through the hopper 13a is heated depends upon the type of the plastic employed. I contemplate that any suitable synthetic thermo-plastic may be employed for the purpose of my invention, such, for example, as ethyl cellulose, cellulose acetate or cellulose acetate butyrate. Plastics of the vinyl resin type are also suitable. In general, these plastics, in order to be transformed into a flat state, must be heated to a temperature of somewhere between 300° F. to 400° F. This temperature, of course, will vary and the particular temperature for the different plastics can, of course, be readily obtained from existing treatises on the subject of plastics.

The extruded stock 10 may be of any desirable cross-section depending, of course, upon the particular nozzle of the extruding machine and the character of the ultimate material desired. I preferably extrude the stock in a continuous rod-like strip directly on the highly polished surface of an endless metallic sheet belt 13 trained over rolls or pulleys 15. By using strip of oval or round cross-section I find that air is more readily displaced upon flattening of the stock, as hereinafter described, than is true of flat strip. In using the round section, I find that the section initially only has substantially a line contact with the supporting plate so that there is less likelihood of air being entrapped as the stock is flattened away from the line of initial contact.

The conveyor belt 13 may be made of any suitable thin metallic sheeting, although I contemplate making it of a metal, such as stainless steel, copper, silver or the like. Either or both of the rolls 14 and 15 may be suitably driven in a manner well known to those in the art. The conveyor should be of a sufficient length to allow the extruded stock 10 to cool to a sufficient extent so that the same at the discharge side of the conveyor can be engaged by upper and lower feed rolls 16—16, embracing the opposite sides of the stock. These rollers may be grooved to conform with the cross-sectional configuration of the stock, and should only exert sufficient pressure on the stock to advance the same without substantially indenting or deforming the strip stock. Additional feed rollers 17, at right angles to the rollers 16, may be employed to also assist in feeding the strip stock into a metallic helical tube 18. If it is so desired, the rollers may be provided with flat peripheral surfaces depending, of course, upon the cross-sectional contour of the strip stock engaged thereby.

While the stock, when it is fed forward into the helical tube 18, is substantially cooler than when it was discharged from the extruder 11, it still is sufficiently warm or hot that it can be given a helical set by its advancement through the tube 18. The tube 18 should have enough convolutions to allow the plastic strip to definitely assume a helical form so that when the strip leaves the tube, it is in the helical or spiral form shown at 19 in Figure 2. The tube 18 must, of course, have a predetermined diameter consistent with the diameter of the ultimate circular ring desired from the formed plastic rod. Also, in order to enhance the setting of the plastic, convolutions of the tube 18 adjacent its discharge end, may be suitably cooled if the same is so desired. Such cooling may be effected by spraying the upper convolutions of the tube with water or by locating these convolutions in a refrigerated area. In any event, it is contemplated that when the spiral rod 19 leaves the tube 18, it will have a sufficient set so that it will not tend to go out of shape.

Thereafter convolutions are progressively cut from the discharge spiral tube 19 so that each cut convolution may be formed into a complete endless ring 20, as shown in Figure 3. The abutting ends of the convolutions may be suitably fused or joined together; in fact, I contemplate employing a method wherein the immediate ends are heated to a high temperature and forcibly pressed into a homogeneous union. Other methods of joining may be employed, such, for example, as treating the ends with a suitable plasticizer or solvent, as the case may be, and forcibly pressing them into an integral union together.

It should be noted that I contemplate that all the operations disclosed above should be more or less in a continuous sequence so that the material can be advanced without interruption, cut off and formed into rings all in a continuous production set-up.

In order to facilitate the removal of the strip stock from the conveyor belt, the surface of the belt 13 may be treated, if it is so desired, with a suitable plastic lubricant, such, for example, as stearic acid, manganese, "Dow Corning Fluid #200," or any other proper lubricant depending upon the particular type of plastic being used. This is true of all the forms of the invention where it is desired to facilitate removal of the plastic from the surfaces on which it is either conveyed or pressed.

The formed ring 20 is thereafter placed in a hydraulic press, designated generally by the reference character 21 in Figure 4, and more particularly is placed on a highly polished lower plate 22 carried on a lower platen 23 of the press. The underside 24 of the plate 22 may be roughened or serrated so as to facilitate its subsequent removal from the lower platen 23. After the plastic ring 20 has been placed by an operator on the polished surface of the plate 22, an upper plate 25 is disposed thereover. The upper side of the plate 25, which is adapted to contact the upper platen 26, may be either roughened or provided with a screen 27, which will not stick to the platen 26. In addition, the center part of the plate is provided with a hole 28 through which air can escape from the center of the ring 20 when the ring is flattened. With respect to this feature attention is directed to my co-pending application Serial No. 603,662, filed July 7, 1945 which has become Patent 2,499,397.

The upper platen 26 of the press is suitably heated, such as by a steam connection 29, inasmuch as the plastic ring 20 must be subjected to a relatively high heat in order to make it flow when the platen 26 is forced down against the platen 23. Also, if it is so desired, the lower platen 23 may be suitably heated.

I further contemplate that the platens may be housed in atmosphere heated to a temperature sufficient to enable the flow of the plastic, under pressure. Any suitable heating means may be provided for this purpose. In addition, it is contemplated that the upper platen 26 may be provided with holes 30 through which air may pass when the platen contacts the upper plate non-stick screen 27 and through which fluid under pressure may be forced in opposite direction after the pressing operation to facilitate the stripping of the plate 25 from the upper platen.

The purpose of this present operation and the hydraulic press 21 is to form the strip ring 20 into a doughnut shaped ring 31, as designated in Figures 5 and 6. I find, however, in pressing strip rings to the flattened or sheet form, for use in a wheel cover, shown in Figure 5, the hydraulic press may be adjusted so that, prior to the pressing operation, the upper platen 26 may be separated from the top plate 25 about three-quarters of an inch and whereby the upper platen will be moved down quickly to a position where the spacing is only about three-sixteenths of an inch. Thereafter three to four seconds may be consumed in completing the downward travel of the platen so that, while the pressing operation is relatively quickly performed, the material is still not hit at such a speed as to cause it to splash. This is important since one of the difficulties heretofore present in the making of plastic sheet has been the elimination from the ensuing sheet of air pockets or voids and irregularities in the surface occasioned by the air pockets or voids.

In addition, it will be perceived from Figure 4 that it is very important that provision be made at 24 and 27 to prevent adhesion of the plates to the platens. The reason for this is apparent when one realizes that upon the squeezing out of the air between the cooperating surfaces of the plates and the platens, air pressure becomes effective to lock the members together. Hence, unless roughened areas are provided, it would be difficult to strip the plates from the platens. Moreover, in the case of the upper plate 25, unless provision was made to prevent its adherence to the upper platen 26, the platen on its return stroke, would pull with it the plate which would likewise exert a pulling force on the plastic, thus deforming it from its polished sheet form.

I also contemplate that one or both of the two plates may be provided with a groove or grooves if it is desired to form ribs or beads in the flattened doughnut. For this feature attention is directed to my copending application Serial No. 654,285, filed March 14, 1946 which has become Patent 2,499,400.

The stripping of the plates 22 and 25 from the platen plastic ring 31 may be greatly facilitated by employing a lubricating material, such as previously alluded to, on the opposite cooperating surfaces of the two plates.

From the foregoing, it is clear that I contemplate taking every precaution to prevent the metal plate 26 from adhering to and moving with the upper platen 26 on its return or up stroke.

The two plates 22 and 25 may be made of any suitable thin metallic sheet, and I contemplate making them of metals, such as stainless steel, copper, silver, or the like. They should preferably be made of a metallic material that has good heat conducting qualities so as to quickly impart heat to the plastic during the pressing operation.

It is also clear that once the plates have been squeezed together, thus excluding air from between them and the flattened plastic, the upper plate will, under the effect of atmospheric pressure, tend to follow down and thus hold the plastic flat until the plates are stripped therefrom.

It is also clear that while my process started with extruded strip or rod stock 10, it results ultimately in the forming of a sheet-like product which has highly polished and smooth surfaces by reason of the character of the pressing operation. The fabrication of sheet-like articles in this fashion is, in my opinion, much more economical than the fabrication of the same articles from cast plastic sheet. While the casting process may be used to advantage where plastic film is needed, it is not suitable to large production of automotive plastic products because of the time element necessary in the setting of the cast material. Needless to say, the thicker the sheet that is cast, the greater the time that is required, and hence the cost will be greater. A cast sheet of the required thickness for use in a product such as a wheel cover would be very prohibitive in cost when compared with the same article blanked from steel sheet.

After the plastic ring 31 has been pressed, it is allowed to cool and is then stripped from the plates 22 and 25. This cooling may be augmented by a blast of air or by passing the doughnut sheet ring 31 through a refrigerated or cooled area. Even this step of the process, however, may be a part of a continuous series of operations. In this connection reference is made to my copending application Serial No. 637,669, filed December 28, 1945 which has become Patent 2,499,399.

Subsequent to the cooling of the doughnut ring 31, it is placed, as shown by the dotted lines in Figure 7, on the top of a dished metallic pan 32. The pan 32, in reality, comprises a lower platen and may be made of any suitable highly polished sheet, such for example, as stainless steel or the like. An upper die member 33 is now caused to strike and press the plastic doughnut 31 into the pan 32 so as to give it the cross-sectional shape of the pan 32. It will be noted that the pan 32 and the upper die member or platen 33 have cooperating surfaces of substantially the same contour so as to insure pressing of the ring 31 into the ultimate dished configuration. In practice I find I can so form the upper die member 33 that it can strike and grip a margin of the ring to hold same while the remaining portion is being depressed to form it to the shape of the top surface of pan 32.

This present operation should likewise be done in the presence of heat and after the ring has been pressed into the dished form shown in cross-section in Figure 7, a blast of cooling air or water should be projected against the structure so as to cause the plastic to take a set before the upper die member 33 is moved away from the pan. It is not necessary, however, in this operation for the plastic to be in a molten state since all that is required is that it be softened enough by the heat so that it can be readily pressed into the configuration desired.

The form of the dished ring shown in Figure 7 particularly lends itself to use as a cover for the exposed outer side of an automobile wheel. My invention, however, is not to be limited to this application since it may be used to advantage in the manufacture of many different types of plastic sheet articles.

It should be noted at this time that I contemplate employing suitable trim operations for trimming the flattened doughnut ring to the desired diameter. Such trimming may take place either before or after the pressing of the ring into dished form, as shown in Figure 7. Any suitable cutting means may be employed for cutting off the peripheral margins of the ring. Also it will be noted from Figure 5A that the grain of the flattened plastic extends in spoke-like manner radially from the center of the ring. This is desirable as it enables a sheet of maximum strength for resisting transverse distortion. In fact, the ring has been found to possess substantially twice as much strength in a radial direction as in a circumferential direction.

I claim as my invention:

1. In an apparatus for forming plastic articles, means for forming hot plastic strip stock, traveling conveyor means for receiving and conveying said stock for a substantial distance while cooling to a consistency to be handled, and a helical-like tube having the entrance thereof spaced from said extruding means and into which said stock is conveyed from said traveling conveyor means while still warm to form the stock into substantially a helix.

2. In an apparatus for continuously forming plastic articles, stationary means for extruding hot plastic strip stock, traveling conveyor means for receiving and conveying said stock away from said extruding means, a helical-like tube into which said stock is conveyed while still warm to form the stock into substantially a helix, and means located adjacent to the exit of the tube for cutting off convolutions from said helix whereby each cut convolution may be formed into an endless ring.

3. In an apparatus for forming plastic articles, means for extruding hot plastic strip stock, traveling conveyor means for receiving and conveying said stock, a helical-like tube having the entrance thereof spaced from said extruding means and into which said stock is conveyed from said conveyor means while still warm to form the stock continuously into substantially a helix, means for successively cutting off convolutions from said helix after it has emerged from the tube whereby each cut convolution may be formed into an endless ring, and means for flattening each strip stock ring into a relatively thin plastic doughnut.

4. In an apparatus for forming plastic articles, means for extruding hot plastic strip stock, means for receiving and conveying said stock, a helical-like tube into which said stock is conveyed while still warm to form the stock into substantially a helix, means for cutting off convolutions from said helix whereby each cut convolution may be formed into an endless ring, means for flattening each strip stock ring into a relatively thin plastic doughnut, and forming means for dishing said flattened doughnut into a ring having substantially a convex-concave cross section.

5. In a continuous method of making circular plastic articles, the steps of extruding soft hot thermoplastic material as a continuous strip at a fixed point, conveying the continuous strip through a cooling zone to a substantial distance away from the extrusion point, and after the continuous strip has cooled sufficiently to be handled but is still pliable enough to be shaped driving the strip continuously through a substantially helical-like path to form the strip into substantially a helix.

6. In a continuous method of making circular plastic articles, the steps of extruding soft hot thermoplastic material as a continuous strip at a fixed point, conveying the continuous strip through a cooling zone to a substantial distance away from the extrusion point, after the continuous strip has cooled sufficiently to be handled but is still pliable enough to be shaped driving the strip continuously through a substantially helical-like path to form the strip into substantially a helix, and continuously severing the advancing portion of the helix after it leaves the helical path into generally circular sections.

7. The method of continuously forming thermoplastic material which comprises continuously extruding a soft hot thermoplastic strip of the plastic material at one point, at a point substantially removed from said extrusion point forming the strip into a substantially helical coil, and conveying the plastic strip between said points and exposed to atmosphere for cooling and stiffening.

8. The method of continuously forming thermoplastic material which comprises extruding the material in soft thermoplastic condition into a rod-like strip, continuously conveying the continuous strip from the extrusion point through a substantial cooling zone wherein the strip is cooled and stiffened, and before the strip has solidified and while it is still pliable shaping the advancing end portion of the strip at a point substantially removed from the extrusion point.

9. In combination in apparatus for forming plastic material, an extruder for shaping and extruding a continuous rod-like strip of thermoplastic material, an endless conveyor receptive of the rod-like strip and of substantial length to carry the strip away from the extrusion point for cooling of the strip, and means for engaging the cooled strip and conducting the strip continuously away from the conveyor.

10. In combination in apparatus for forming plastic material, an extruder for shaping and extruding a continuous rod-like strip of thermoplastic material, an endless conveyor receptive of the rod-like strip and of substantial length to carry the strip away from the extrusion point for cooling of the strip, means for engaging the cooled strip and conducting the strip continuously away from the conveyor, and means cooperatively related to said last mentioned means receptive of the continuous strip for forming the same into a helical-like shape.

11. In combination in a plastic forming apparatus, a horizontal endless conveyor having an upper carrying run, an extruder located adjacent to the trailing end of said carrying run and arranged to deposit upon the carrying run a rod of thermoplastic material, a set of impeller rolls adjacent to the forward end of said carrying run engageable with the thermoplastic rod after the same has stiffened in traveling with said carrying run, and means defining a forming path located beyond said set of rolls and receptive of the rod as impelled thereinto by said rolls.

GEORGE ALBERT LYON.

REFERENCES CITED

The following references are of record in the file of this patent:

UNITED STATES PATENTS

| Number | Name | Date |
|---|---|---|
| 1,327,721 | Mattison, Jr. | Jan. 13, 1920 |
| 1,674,574 | Semple | June 19, 1928 |
| 1,831,779 | MacDonald | Nov. 10, 1931 |
| 1,918,127 | Pfeiffer | July 11, 1933 |
| 2,067,025 | Schmidt | Jan. 5, 1937 |
| 2,075,735 | Loomis | Mar. 30, 1937 |
| 2,265,436 | Loblein | Dec. 9, 1941 |
| 2,317,687 | Larchar | Apr. 27, 1943 |
| 2,358,535 | Reymond et al. | Sept. 19, 1944 |
| 2,371,074 | Spencer | Mar. 6, 1945 |
| 2,375,357 | Friedman | May 8, 1945 |